Sept. 28, 1965  T. O. SUMMERS  3,208,155
ATTITUDE INDICATOR
Filed Sept. 16, 1960  7 Sheets-Sheet 1

THOMAS O. SUMMERS,
INVENTOR.

BY R.E. Geauque
ATTORNEY

INVENTOR.
THOMAS O SUMMERS,
BY R.E. Geanque
ATTORNEY

Thomas O. Summers,
INVENTOR.
BY
R.E. Deanque
ATTORNEY

United States Patent Office 3,208,155
Patented Sept. 28, 1965

3,208,155
ATTITUDE INDICATOR
Thomas O. Summers, Encino, Calif., assignor, by mesne assignments, to Security First National Bank, Los Angeles, Calif., a national banking association
Filed Sept. 16, 1960, Ser. No. 56,446
5 Claims. (Cl. 33—204)

This invention relates to an attitude indicator and more particularly to an attitude indicator completely contained in a single case.

In general, attitude indicators presently in use are units separate from the gyroscope and gyroscope control units associated therewith, and the indicator is generally mounted remotely from the gyroscope unit. In the present invention, the indicator sphere is driven by a gyroscope supported by an outer gimbal which is cantilevered at one end of the bearing shaft. The indicator sphere is supported at the other end of the outer gimbal on a normally horizontal axis so that the indicator sphere can be driven by the inner gimbal of the gyro through a gear train carried by the outer gimbal. Thus, the outer, or roll, gimbal is cantilevered to provide an unobstructed view of the indicating sphere located at the far end of the outer gimbal which is the display end. Since the indicating sphere is carried by the outer, or roll, gimbal and is rotatable by the inner, or pitch gimbal, the indicator sphere is capable of providing both pitch and roll indications.

Because the cantilever mounting of the outer gimbal is conducive to high friction, the bearing friction as well as the weight of the gyroscope and indicator are held to a minimum. The gyroscope is generally simplified by eliminating the requirement for fast erection upon starting of the gyro motor. The gyro rotor is electrically driven and comprises a stationary portion and a portion adopted for up and down axial movement. Upon starting of the rotor, centrifugal force causes inertia balls, located between the portions, to lift the movable portion into a position of neutral equilibrium. Prior to starting of the rotor, the gyro assumes a position of stable equilibrium since the gyro is gravity sensitive because of the lower position assumed by the movable portion. Further, air circulated by an impeller attached to the rotor, is discharged through orifices at the bottom of the inner gimbal case in order to gravity erect the gyro without the use of separate electrical erecting motors. The orifices are controlled by pendulous vanes so that upon a displacement of the gyro from vertical, an erecting torque, due to the jet action of the gas, is produced at right angles to the displacement.

The jet streams produced by the impeller for erection purposes circulate the gas within the hermetically sealed casing. Thus, the plastic indicating sphere and roll ring, which are continually heated by the lighting elements, are prevented from overheating by the circulation of gas. The concentration of heat in and about the sphere and roll ring tends to distort these parts and a separate blower would be required in the absence of the jet streams, thus adding to the complexity of the instrument.

A bearing construction is provided for the cantilevered outer gimbal which minimizes the effect of friction about the outer gimbal or roll axis. The cantilevered pivotal shaft is mounted on a redundant bearing support which in turn, is supported by the frame of the instrument so that clockwise and counter-clockwise rotation of the redundant support develops clockwise and counter-clockwise frictional torque about the outer gimbal. Motor means are provided for continually oscillating the redundant support at a constant frequency and amplitude so that these torques are equal and opposite and cancel out. In addition to the bearing friction, the slip ring friction, resulting from the necessity of a number of separate circuits to th egyro and indicator, is also minimized by the oscillation. In fact, the slip ring friction is virtually eliminated by employing redundant slip rings affixed to the redundant support, so that when the redundant support is oscillated, slip ring friction affecting the gyro is first clockwise and then counter-clockwise.

Thus, the usual precession and inaccuracies due to bearing and slip ring friction are virtually eliminated and at no time is the outer gimbal materially affected by static friction. In order to minimize friction about the inner gimbal, the amplitude and frequency of the oscillation are set to a value that will result in a definite oscillation of the inner gimbal but at an almost imperceptible amplitude. Such an oscillation about the inner gimbal, though virtually imperceptible, assures kinetic rather than static friction about the inner gimbal.

It is therefore an object of the present invention to provide an attitude indicator having an indicator sphere and gyro rotor mounted in a cantilevered outer gimbal.

Another object of the invention is to provide an attitude indicator having an indicator sphere and gyro rotor mounted side by side in a cantilevered outer gimbal, said rotor having a portion movable upon rotation from a position of static equilibrium to a position of neutral equilibrium and being gas erected by jet streams produced by an impeller driven by the rotor.

Another object of the invention is to provide a cantilevered outer gimbal structure for a gyroscope in which one end of the gimbal is mounted on a redundant bearing support which, in turn, is supported by the frame of the gyroscope, said redundant support being oscillated to minimize friction.

Another object of the invention is to provide a gyro rotor having a portion movable, upon rotation, from a position of stable equilibrium (with its center of gravity below the point of intersection of the inner and outer gimbal axes) to a position of neutral equilibrium (with its center of gravity at the point of intersection of the inner and outer gimbal axes), thereby eliminating the requirement for a fast erection means.

Another object of the invention is to provide an attitude indicator having an indicator sphere and gyro rotor mounted side by side in the same casing, said rotor being electrically driven and gas erected by jet stream provided by an impeller connected with the rotor, the temperature within said casing being maintained uniform by circulation caused by said jet stream so that hot spots do not develop at the indicator sphere.

Another object of the present invention is to provide a gyroscope and indicating sphere combination mounted on a common support in side by side relationship and having a direct connection therebetween, said gyro being gravity responsive when turned off so that the indicator is maintained level during such time.

These and other objects of the invention not specifically set forth above will become readily apparent from the accompanying descriptions and drawings in which:

FIGURE 5 is a horizontal section along line 5—5 of

FIGURE 4 illustrating the indicator sphere and the pointer carried by the outer gimbal.

Figure 1:
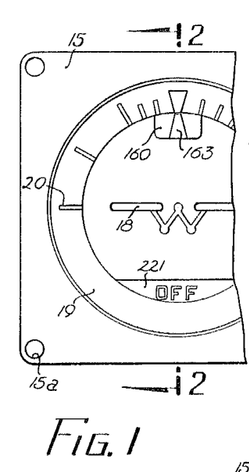
FIGURE 1 is a partial front elevational view of the indicator end of the instrument of the present invention.
Figure 2:
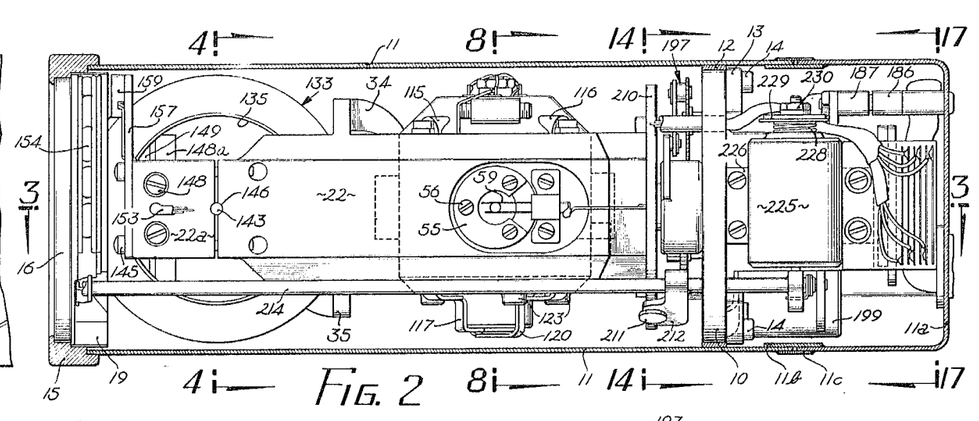
FIGURE 2 is a vertical section, partially in elevation, along line 2—2 of FIGURE 1, showing a gyro gimbal and indicating sphere mounted side by side on the cantilevered outer gimbal.
Figure 3:
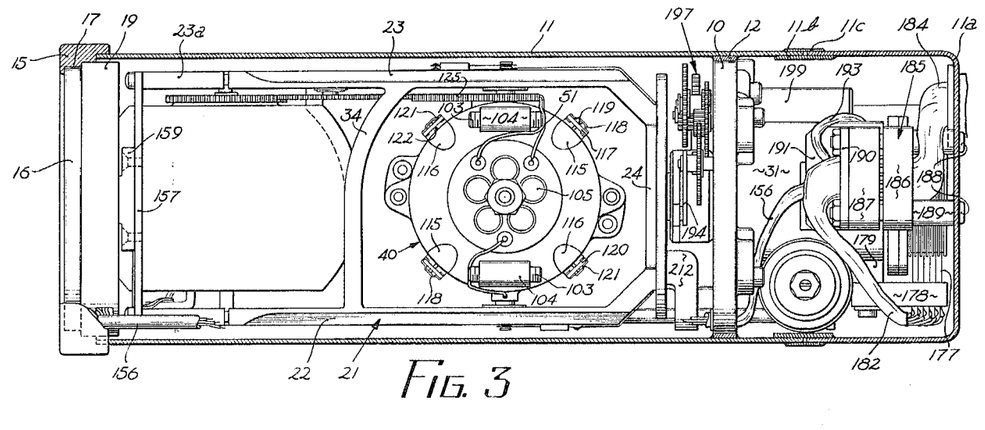
FIGURE 3 is a horizontal section along line 3—3 of FIGURE 2, showing the gear train utilized to oscillate the redundant bearing support.
Figure 4:
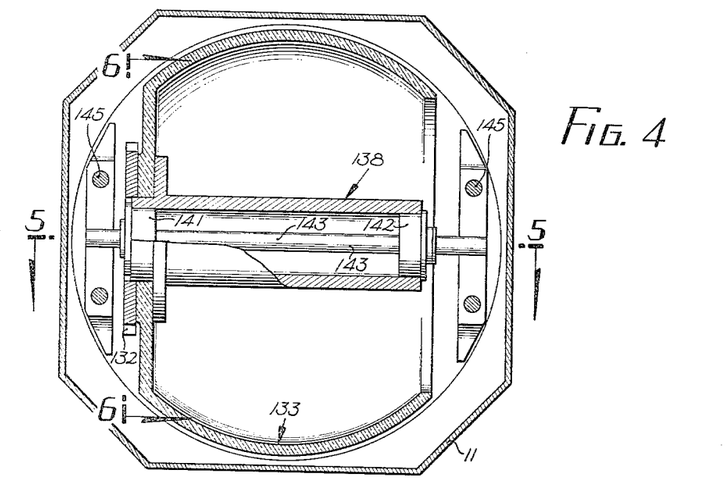
FIGURE 4 is a transverse vertical section along the 4—4 of FIGURE 2, showing the mounting for the indicating sphere.

Referring to FIGURE 1–3, an embodiment of the invention is illustrated wherein a central mounting plate 10 serves to support the instrument. The plate 10 is located in a casing 11 and fits into a circular opening in the partition 12 which is brazed to the casing 11. The central mounting plate 10 carries legs 13 (see FIGURE 17) which receive screws 14 to firmly attach the mounting plate 10 to the partition 12. The casing 11 has an end cap 11a having an offset 11b received in the end of the casing and a sealing strip 11c retains the cap. The opposite end of the casing receives a frame 15 in which is secured a glass panel 16 by means of solder seal 17. An airplane model 18 is secured to the inside center of the circular panel 16 (see FIGURE 5) and a plastic ring 19 is secured in frame 15 and carries the bank scale 20 (see FIGURE 1). The frame 15 is provided with openings 15a for mounting the indicator on an instrument panel.

*Gyroscope unit*

Figure 16:
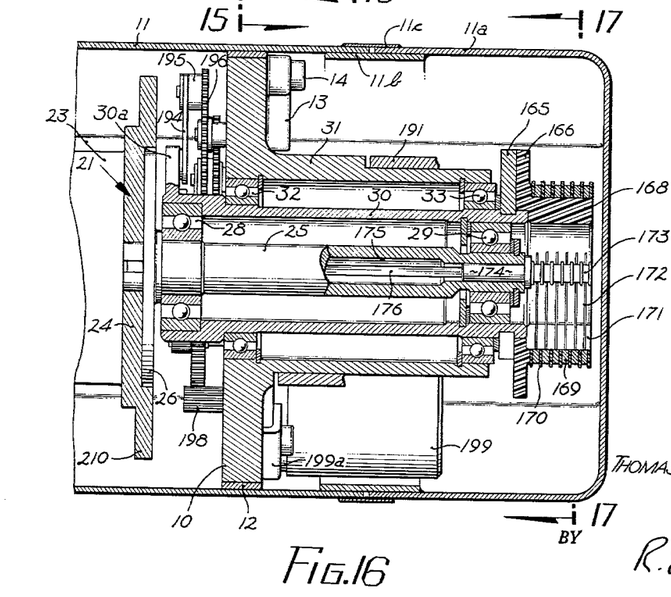
FIGURE 16 is a section along line 16—16 of FIGURE 14, illustrating the redundant bearing support transposed between the cantilevered outer gimbal shaft and the gyro frame.

Referring to FIGURES 1 and 16, outer gimbal 21 is in the form of a "U" frame comprised of legs 22, 23 and end 24, and a gimbal shaft 25 has a flange portion 26 secured by screws 27 to the end 24 of the outer gimbal 21. The shaft 25 is cantilevered by a pair of spaced bearings 28, 29 contained by a redundant bearing support 30. The mounting frame 10 has a cylindrical projection 31 which contains the redundant bearing support 30 and the shaft 25, and the projection mounts the redundant spaced bearing support by bearings 32, 33 as will be later explained. Oscillation of the redundant bearing support 30 greatly reduces the bearing and slip ring friction experienced by the cantilevered shaft 25. In order to increase the rigidity of the legs 22 and 23 of the outer gimbal, top and bottom curved brackets 34 and 35 extend between the legs.

Figure 6:
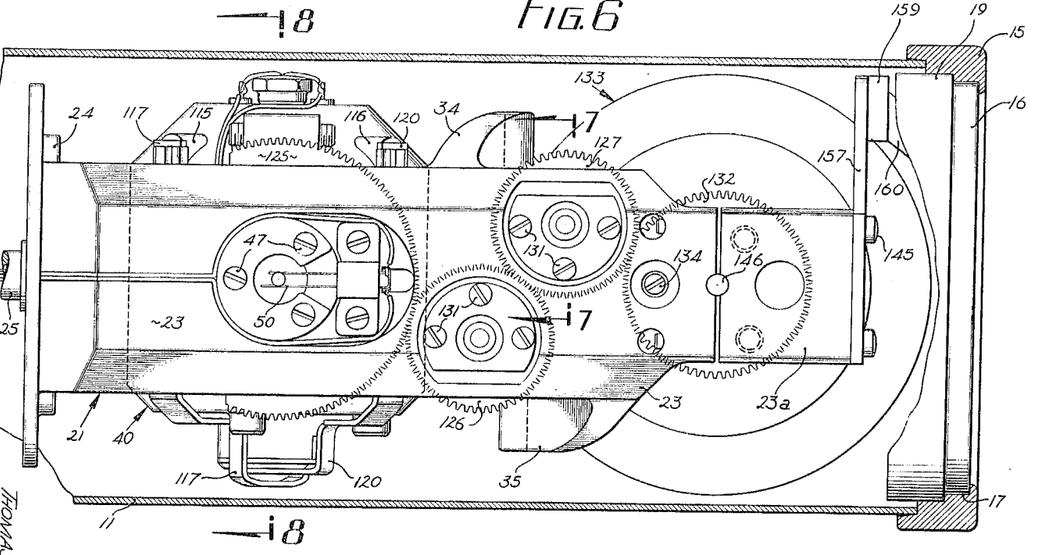
FIGURE 6 is a side elevational view along line 6—6 of FIGURE 4 showing the gear train connecting the gyroscope with the indicator sphere.
Figures 8, 9, 10:
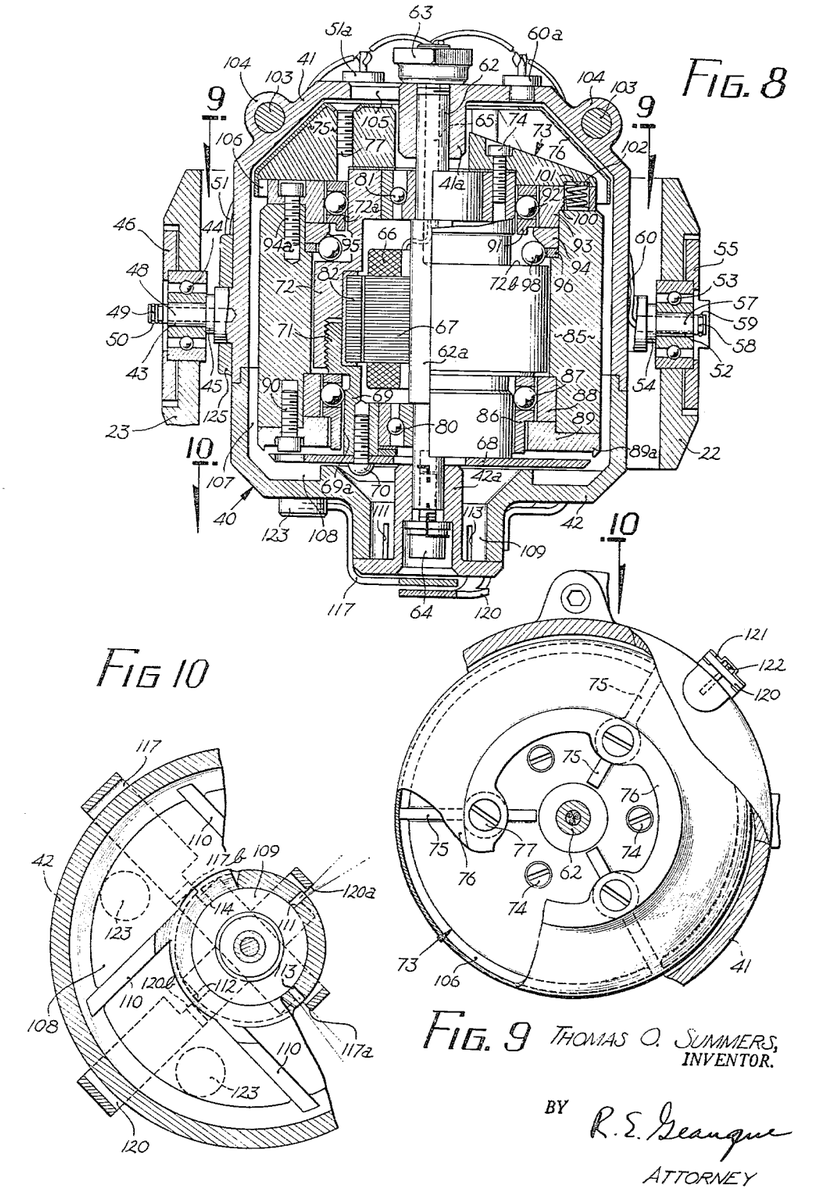
FIGURE 8 is a transverse vertical section along line 8—8 of FIGURE 6, illustrating the construction of the gyroscope with the movable portion in the up position; a portion of the driven gear being removed.
FIGURE 9 is a section along line 9—9 of FIGURE 8 showing the movable cap portion of the gyro rotor.
FIGURE 10 is a section along line 10—10 of FIGURE 8, showing the pendulous flippers for erecting the gyroscope.

Referring to FIGURE 8, a rotor casing 40 is comprised of upper and lower sections 41 and 42, respectively, and the upper section has a first shaft 43 supported in a bearing 44 retained in leg 23 of the outer gimbal by a shaft enlargement 45 and a retaining member 46, secured to the outer gimbal by screws 47 (see also FIGURE 6). A conducting pin 48 extends through shaft 43 and has slip rings 49 cooperating with wipers 50. The conducting pin 48 serves to connect the slip rings with the leads 51 for the gyro motor. In a similar manner, a second shaft 52 projects from the rotor casing 40 through the outer gimbal leg 22 and is mounted in a ball bearing 53 retained by shaft enlargement 54 and retainer member 55, which is secured to leg 22 by screws 56. A conducting pin 57 extends through shaft 52 and has a slip ring 58, cooperating with wiper 59 in order to connect the wiper with the lead 60 for the gyro motor. Thus, the shafts 43 and 52 define an axis about which the rotor casing 40 can move relative to the outer gimbal 21 and electric lines to the gyro motor can pass through the outer gimbal to the inner gimbal through the shafts.

The gyro comprises a stationary shaft 62 extending through the inner gimbal and the nuts 63 and 64 on opposite ends of the shaft serve to hold the portions 41 and 42 of the rotor casing 40 together. The shaft is alined by extending portion 41a of the upper section and extending portion 42a forming a part of the lower section 42. The leads 51 and 60 pass through a central opening 65 in the shaft and connect with the stator winding 66 supported by laminations 67 about an enlarged portion 62a of shaft 62. The leads are supported at the top of the rotor by ceramic inserts 51a and 60a. A first portion of the gyro rotor is comprised of end plate 68 secured to lower section 69 by screws 70 and the lower section has a thraded end 71 attached to an upper section 72. An impeller head 73 is secured by bolts 74 to upper section 72 and carries a plurality of impellers 75 on its upper surface, the impellers being surrounded by an annular shroud 76 secured to the impellers by bolts 77.

One ball bearing 80 for shaft 62 is located between the shaft and lower section 71 and is retained between enlarged shaft portion 62a and plate 68. A second ball bearing 81 is located between the shaft and upper portion 72 and is retained between enlarged shaft portion 62a and the rotor head 73. It is therefore apparent that a non-axially movable portion of the rotor comprises plate 68, sections 69 and 72, and rotor head 73 and this portion is mounted for rotation upon bearings 80 and 81, in fixed axial position with respect to the shaft 62. The armature 82 for the rotor is held tightly between sections 69 and 72 and in position opposite to the winding 66.

A second portion 85 of the rotor is movable axially of the shaft 62 while being rotatable with the non-axially movable portion. A first bearing support is provided at the lower end of movable portion 85 and comprises a retainer 86 for ball bearings 87. The balls 87 roll on the exterior surface 69a of section 69 and on a ring 88 carried by movable portion 85. Both the ring and retainer are held in place by a cap member 89 secured by bolts 90 to portion 85. The second bearing support for the movable portion 85 comprises a retainer 91 for ball bearings 92 and the ball bearings roll on the exterior surface 72a of section 72 and on a ring 93 secured to movable portion 85 by bolts 94a. The ring 93 secures the cam ring 94 having a cam surface 95 and also secures a ring 96 having slots 97 (see FIGURE 13) containing inertial balls 98 which roll on a surface 72b of section 72. The ring 93 contains three openings 100 in alignment with three openings 101 in the rotor head 73 and a spring 102 is located in the combined space of each pair of openings. Since the rotor head 73 is a part of the non-movable rotor portion, it will be directly rotated by the gyro motor and its rotation will be imparted to the axially movable portion 85 through the three springs 102. The balls 98 will move outwardly against the cam surface 95 to move the portion 85 relative to the fixed portion of the rotor and against the springs 102 when the rotor reaches a predetermined speed.

Figures 11, 12, 13:
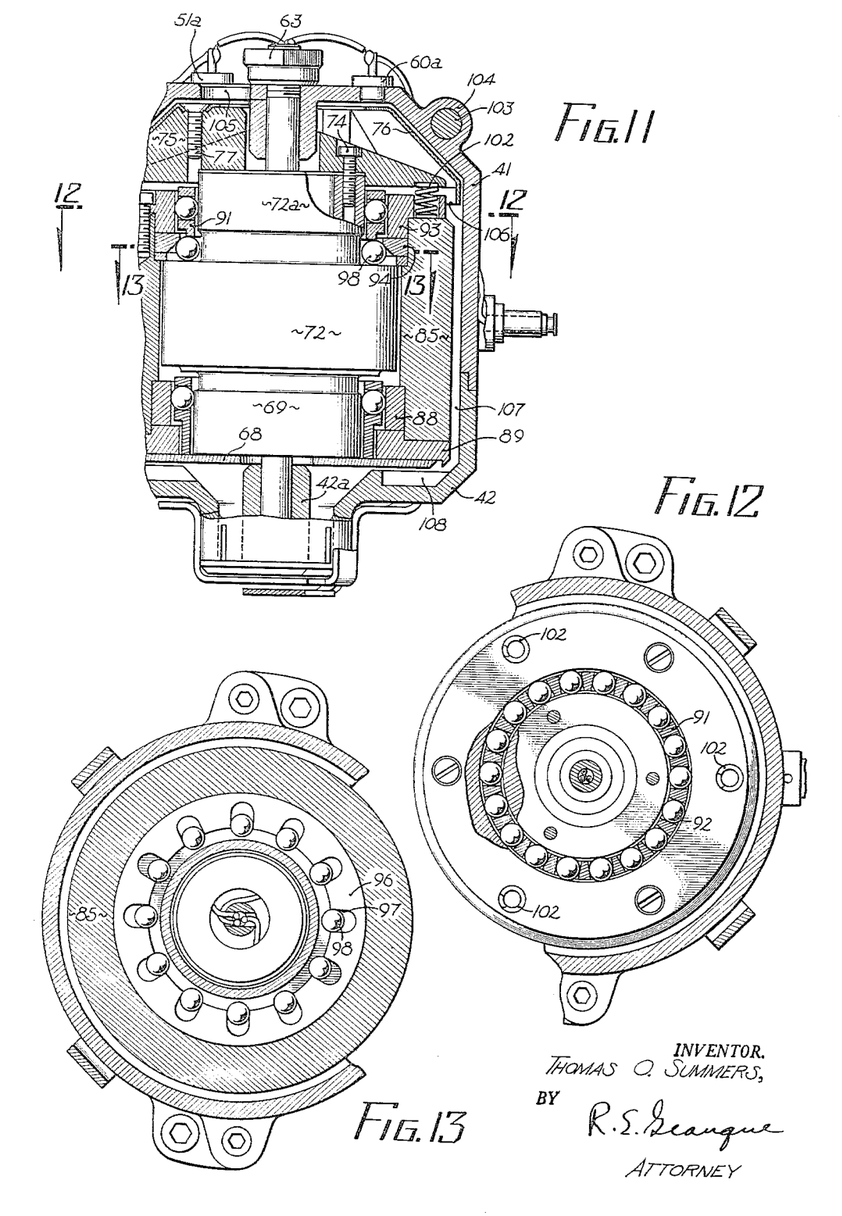
FIGURE 11 is a sectional view similar to FIGURE 8 showing the movable portion of the gyro rotor in the down position.
FIGURE 12 is a section along 12—12 of FIGURE 11, showing the bearings for guiding the movable portion of the rotor.
FIGURE 13 is a section along line 13—13 of FIGURE 11 showing the inertia balls for raising the movable portion of the rotor.

The position of the movable portion 85 when the rotor is stationary is shown in FIGURE 11. In this condition the springs 102 force the portion 85 downwardly until the ring 89 engages the plate 68 forming a part of the stationary portion of the rotor. In this lower position of portion 85, the complete inner gimbal and rotor assembly is in static equilibrium, having its center of gravity below the point of intersection of the inner and outer gimbal axes determined by the intersection of the axis of outer gimbal shaft 25 wtih the axis of inner gimbal shafts 43 and 52. Thus, in this condition, the complete inner gimbal and rotor assembly is pendulous and the shaft 62 will remain in a gravity vertical position independently of movement of the outer gimbal. Upon energizing the gyro motor winding 66, the fixed portion of the rotor will increase in speed and will drive the axially movable portion 85 through the springs 102. When a predetermined speed is reached, the balls 98 will move radially, under the influence of centrifugal force, against the cam surface 95 in order to move the movable rotor portion 85 upwardly into the position shown in FIGURE 8. In this position, the ring 93 is held in engagement with the head 73 by the force of the inertia balls 98. In the operating position of FIGURE 8, the center of gravity of the rotor casing 40 and gyro rotor is at the intersection of inner and outer gimbal axes so that the gyroscope is in a condition of neutral equilibrium.

Since the gyro is in stable equilibrium and hangs vertically like a pendulum when it is turned off, an erection system having a slow erection rate can be utilized. Also, while operating, the gyro is maintained in neutral equilibrium since any pendulousity of the universally supported gyro will produce an undesirable spiraling toward the vertical. The axial up and down movement of the outer rotor portion with respect to the inner rotor portion is permitted by the ball bearings 80 and 81 and this movement is upward because of centrifugal force exerted by balls 92 and is downward under the action of the springs 102. In spite of this axial movement, the outer rotor portions can be dynamically balanced because it is always maintained in virtual concentricity with the inner rotor portions through these bearing supports. The ball bearings 80 and 81 are heavily preloaded to achieve concentricity, and to attain substantial friction-free axial movement of the outer rotor, the balls are made to roll rather than slide along the race ways, namely the rings 88, 93 and surfaces 69a, 72a of the inner rotor portions. The balls are maintained in alignment by the metal cages 86, 91 and are pressed tightly for preloading between the races to assure stable alignment of the inner and outer rotor portions and thus, permit dynamic balancing of both rotor portions.

Each of the cages at upper extreme of its travel, encounters a pair of stops, namely the rotor head 73 and ring 94 for cake 91 and plate 89 and inner rotor section 69 for the race 86 (see FIGURE 8). Thus, during operation when the rotor is running and maximum vibration would be encountered, the races are held firmly against movement so that they cannot drift from the up position shown in FIGURE 8. For each cage, one of the stops is a part of the inner rotor portions and the other stop is part of the outer rotor portions. By comparison of FIGURE 8 and 11, it is apparent that the axially movable rotor portion 85 will move upwardly twice as fast as the cages 86 and 91 since the balls 92 can only roll and cannot slide bodily.

In order to originally balance the gyro, balance weights 103 are threaded into openings 104 contained in the top of the rotor casing so that the mass of the weights can be shifted relative to the gimbal axis.

*Erection system*

As previously stated, the gyroscope is pendulous when not operating. Therefore, a slow erecting system such as a slow gas erection system, can be utilized. The top of section 41 of the rotor casing contains a plurality of the openings 105. The impellers 75 rotate with the gyro rotor to draw gas through the openings 105 and discharge the gas through the annular space 106 between the lip of shroud 76 and ring 93. The space 106 connects with the passage 107 extending along the outer surface of the movable rotor portion 85. Passage 107 connects with a lower space 108 which communicates with a well 109, formed by the lower section 42 of the rotor casing and the extending portion 42a, and the space 108 contains a plurality of vanes 110 for directing the gas into the well 109. As illustrated in FIGURE 8, the cap member 89 has a lip 89a to provide for non-turbulent air flow from passage 107 to space 108 when the movable rotor portion 85 is in the upper position. The side of the rotor casing section 42 forming well 109 contains four slots 111–114 and by controlling the air jets discharged through these slots, the torques produced on the inner gimbal can be controlled to gravity erect the gyro.

The inner gimbal case contains a first pair of projections 115 located 180° apart (see FIGURE 3) and a second pair of projections 116 also located 180° apart; the plane of the first pair of projections being transverse to the plane of the second pair. A first pendulous flipper 117 has its opposite ends secured in brackets 118 which are pivotally supported in projections 115 by pins 119. In a similar manner, a second pendulous flipper 120 has its opposite ends secured by brackets 121 which are pivotally secured to projections 116 by pins 122. As illustrated in FIGURES 2 and 6, the flippers 117 and 120 follow the contour of the inner gimbal 40, including the lower section 42, and the flipper 120 passes below the flipper 117 to permit movement of both the flippers transversely to one another.

The flipper 117 has a first cutout forming an edge 117a opposite orifice 113 and a second cutout forming an edge 117b opposite orifice 114. In a similar manner, the flipper 120 has a cutout providing an edge 120a opposite orifice 111 and a second cutout providing an edge 120b opposite the orifice 112. It is understood that the pair of jets 111, 112 and the pair of jets 113, 114 have a common line of action but are oppositely directed and that these lines of action are perpendicular to each other and to the gyro spin axis. Normally, both of the flippers hang vertically in front of their respective jets and equally impair the escaping gas. Thus, when the flippers and the rotor spin axis are in vertical position, the two pairs of equally and oppositely directed jets produce two pairs of equal and opposite torques about the inner gimbal axis. Since the planes of the two flippers are perpendicular to one another and each plane is at an angle to the outer gimbal axis, each flipper will be affected by deviations of the gyro rotor spin axis from either the true vertical position in either pitch or roll. Thus, upon a displacement of either outer gimbal 21 or the inner gimbal 40 from vertical position, each of the pendulous flippers will move to open one of its controlled openings and close the other so that a resultant torque will be produced about the pitch and/or roll axes to precess the gyro rotor back to the vertical.

This type of gas erection system is well-known and is particularly suitable for incorporation in the present invention because much lower air pressure can be used than in conventional systems to erect the gyro. The gas stream passing around the rotor through passage 107 serves to cool the rotor motor and rotor bearings and thereby increases rotor life. As previously stated, it is unnecessary to provide the gyro with a fast erection system since the rotor is pendulous when not in operation. The lower section 42 of the inner gimbal carries four stops 123 to limit the movement of the flippers 117 and 120 about their respective axes.

*Attitude presentation*

Figure 7:
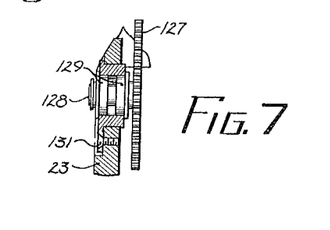
FIGURE 7 is a sectional view along line 7—7 of FIGURE 6, illustrating the mounting structure for one of the gears of the gear train.

The inner gimbal 40 mounts a gear segment 125 (see FIGURE 6) about shaft 43 and this segment meshes with a gear 126 which in turn meshes with a gear 127; the gears 126 and 127 each being rotatably mounted on the arm 23 of the outer gimbal by a shaft 128 located in bearings 129 which are retained in the arm 23 by a plurality of bolts 131 (see FIGURE 7). The gear 127 meshes with a gear 132 which is secured to one side of an indicating sphere 133 by means of bolts 134. The indicating sphere 133 is fully opened at the side 135 and the opposite side 136 contains an opening for receiving end 137 of hub 138, an angular flange 139 on the hub abuts side 136 opposite the gear 132 and the bolts 134 serve to secure both the sphere 133 and gear 132 to the hub 138. The end 137 and end 140 of the hub are supported on bearings 141 and 142, respectively, and these bearings are in turn supported by a shaft 143 extending through the interior of the hub. Snap rings 144 serve to retain the bearings upon the shaft.

End portions 22a and 23a of the outer gimbal arms 22 and 23, respectively, are each secured by a pair of bolts 145, and both arms and end portions have circular cutouts 146 for gripping an end of shaft 143 when the bolts 145 are tightened. Thus, the shaft 143 is held stationary by the outer gimbal, and the indicating sphere 133 is rotated about the shaft 143 upon movement of gear 132 by relative movement between the casing and the inner gimbal. The indicating sphere 133 is constructed of a translucent plastic material and carries suitable markings, such as dive and climb indices.

Figure 5:
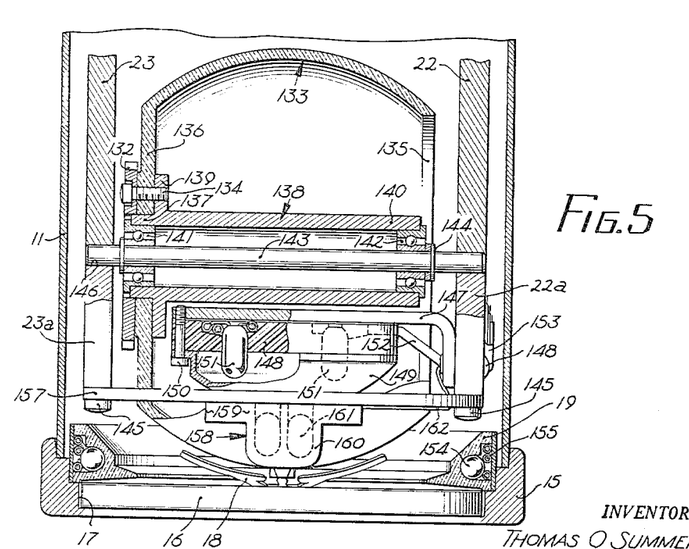

The end portion 22a supports a bracket 147 by means of bolts 148 and the bracket extends into the sphere 133 through the open side 135. An insulated plate 148a and a diffusing lens 149 are secured to bracket 147 by bolts 150 and a plurality of lights 151 are supported by the insulated plate within the lens. The lights are energized by wires 152 which pass through the end portion 22a and connect with the cable 153. The lens 149 therefore serves to illuminate the front surface of the plastic sphere 133. The airplane model 18, which is secured to glass window 16, cooperates with the indices on the sphere 133 to provide an indication of pitch attitude. As previously stated, a bank scale 20 is marked around the edge of the plastic ring 19 and the outer circumference of ring 19 is cut out to receive a plurality of lights 154 which are energized by wiring 155 leading from cable 156 (see FIGURE 3).

A bracket 157 is secured to the end portions 22a and 23a by the bolts 145 and extends over the sphere 133. A Lucite housing 158 has a base 159 secured to the bracket 157 and also has an extension 160 containing lights 161 which are energized by wiring 162 leading from cable 153. A tapered pointer 163 (see FIGURE 1) is secured to the end of the extension 160 and is located opposite the bank scale on the ring 19 in order to provide a visual turn indication.

As described, the indicator sphere 133 and the gyroscope are mounted side by side on the cantilevered outer gimbal 21 and the indicator sphere is directly connected to the inner gimbal of the gyroscope through a gear train carried by the outer gimbal. Since the gyroscope utilizes a gas erection system, the gas circulation within the instrument casing prevents the concentration of heat at the indicating sphere which would otherwise result because of the concentration of lights. The instrument casing 11 is hermetically sealed with a dry inert gas and is thoroughly purged before sealing. However, some moisture might be trapped by the various parts and this moisture would accumulate on the glass 16 under various environmental conditions if it were not for the continuous circulation of gas in the casing. It is understood that the gas within the casing will be heated by the electrical energy consumed within the casing, but that the circulating of gas prevents concentration of heat which would tend to distort the indicating components of the instrument.

The indicating sphere 133 moves in the direction the real horizon appears to move with the aircraft pitch, and reverse gearing is utilized between the inner gimbal and the sphere so that when the inner gimbal moves clockwise, the sphere moves counter-clockwise and vice versa. Also, the gearing is such that the sphere moves through a greater angle than the inner gimbal in order to amplify pitch movements.

*Outer gimbal shaft*

As previously stated, the outer gimbal shaft 25 is cantilevered by a pair of spaced bearings 28, 29 located between the shaft and the redundant bearing support 30 and the redundant support is in turn mounted by spaced bearings 32 and 33. As illustrated in FIGURE 16, suitable bearing retaining rings are provided to maintain all of these bearings in position. The end of the redundant support 30 contains a groove in which is located a partial ring 165 and a second ring 166 is located around the end of redundant support 30 and is secured to ring 165 by means of bolts 167. An insulating cylindrical member 168 extends from ring 166 and supports six conducting rings 169 separated by insulating spaces 170. The member 168 contains a slot 171 (see FIGURE 17) so that a pair of wipers 172 can project inwardly from each ring 169 and engage a smaller slip ring 173. Six of the smaller slip rings 173 are supported by an insert 174 projecting into the end of opening 175 within shaft 25. A cable 176 contains leads connecting with the slip rings 173, and this cable extends through the shaft 25 and through an opening in the end 24 of the outer gimbal so that the leads can connect with wipers 50 and 59 and with the indicator leads 152 and 162, all of which are located on the outer gimbal.

A pair of wipers 177 (see FIGURE 3) engage each of the slip rings 169 and these wipers are mounted on an insulated support 178 spaced by a block 179 from a flat surface 180 of the frame projection 31. Bolts 181 pass through the wiper mount 178 and through the block 180 into the projection 31. Each pair of wipers 177 are connected by a bar 177a located in support 178 and a cable 182 contains leads 183 each connecting to one of said bars (see FIGURE 18). The casing end cap 11a contains an opening for the main power cable 184 which connects with socket 185. The male and female plug members 186, 187 are supported by rods 188 which carry spacers 189 and connect with bracket 190. Bracket 190 has a leg 191 which is secured to a flat section of frame projection 31 by bolts 192. In addition to the cable 182, the female plug member also connects with the cable 156 and with the cable 193 leading to other components.

It is apparent that if the cantilevered gimbal were supported directly by the gyro casing, there would be considerable bearing and slip friction applied to the outer gimbal shaft causing unwanted precession of the gyroscope. The effect of friction would be aggravated because both the gyro rotor and the indicator sphere are located side by side in the outer gimbal and the indicator is located a considerable distance from the mounting shaft. However, by oscillation of the redundant bearing support 30, the usual unwanted precession due to bearing and slip ring friction is virtually eliminated.

Figure 15:
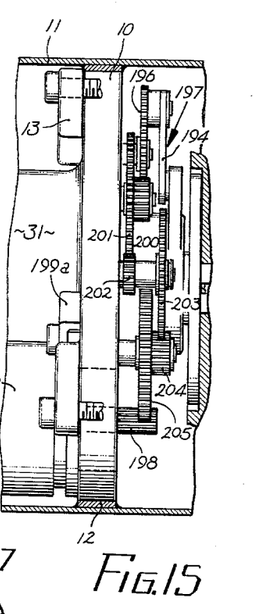
FIGURE 15 is a section along line 15—15 of FIGURE 14, showing the oscillating gear train.

The end of the support 30 opposite the slip rings, carries a lug 30a which is pivotally connected to one end of a crank arm 194 and the other end of the arm is pivotally connected to a post 195 located at the periphery of a gear 196. The gear 196 is the terminal gear of a gear train 197 driven by a pinion gear 198 connected to a constant speed motor 199 which is secured to frame 10 by a plurality of lugs 199a. As illustrated in FIGURE 15, the gear train between gear 196 and pinion 198 comprises gears 200–205 and the train serves to reduce the rotational speed of the gear 196. As the gear 196 rotates, the arm 194 will cause the redundant bearing support 30 to rock back and forth. The effect of this continual oscillation will be to produce alternately positive and negative friction torques of equal value about the outer roll gimbal shaft which, in turn, will induce a slight oscillation of the gyro about the inner pitch gimbal axis. Therefore, the bearing and slip ring friction about the outer and inner gimbal axes will be solely kinetic rather than static and since the redundant support is rotated clockwise half the time, and counter-clockwise half the time, the effect of friction on the entire pitch and roll gimbal system can be virtually nullified.

The oscillation of the redundant support 30 and the induced oscillation of the inner gimbal 40 are at the same frequency, but the amplitude of the inner gimbal oscillation will be greatly attenuated. The gear reduction train 197 makes it possible to lower the frequency and thereby decreases the amplitude of the inner gimbal oscillation to where it is almost imperceptible. This very small amplitude of inner gimbal oscillation is all that is necessary to virtually nullify gimbal friction about the inner gimbal axis. Thus, the gyro vertical of the present invention, in spite of its cantilevered outer gimbal support, is virtually friction free about the pitch and roll axes. Since the inner gimbal oscillates the indicating sphere at the oscillating frequency of the redundant support, the small friction in the gear train connecting the inner pitch gimbal to the indicator sphere is virtually nullified. Thus, by utilizing the gear train 197, a small, constant speed motor, connected to leads in cable 193, can be utilized and the continual oscillation of the redundant support changes the slip ring, bearing and gearing friction to kinetic friction which develops clockwise and counter-clockwise torques about the gimbal axes which are equal and opposite so that they virtually cancel.

*Starting brake solenoid*

Figure 14:
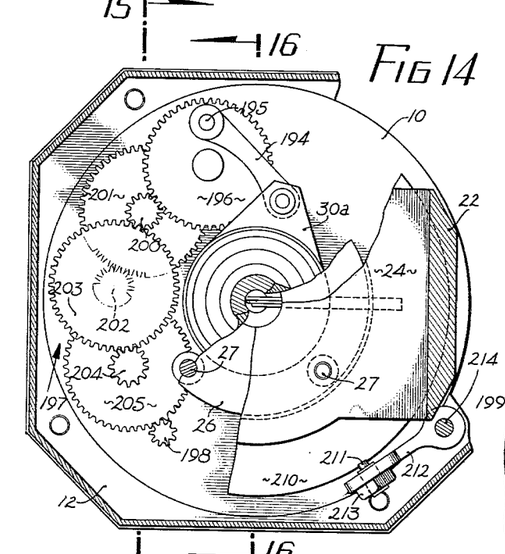
FIGURE 14 is a transverse section along line 14—14 of FIGURE 2, showing the gear train and linkage for oscillating the redundant bearing support.

The end 24 of the outer gimbal has a circular rim 210 which is normally engaged with a brake shoe 211 when the gyroscope is de-energized (see FIGURE 14). The brake shoe is secured to one end of a lever arm 212 by a nut 213 and the other end is secured to a rod 214. The rod passes through the mounting plate 10 and has one end pivotally supported in an opening 215 in the front bezel 15 (see FIGURE 18). The other end of the rod is supported in a bracket 216 which has a flat base 217 secured to a flat portion of frame projection 31 by bolts 218 (see FIGURE 20). A second arm 219 is connected to rod 214 and a spring 220 is wound around the rod and has one end connected to arm 219 and the other end connected to bracket 216. The force of the spring 220 on the arm 219 is in a direction to continually bias the rod in a direction to hold the brake shoe 211 against the rim 210 in order to lock the position of the outer gimbal.

Figure 19:
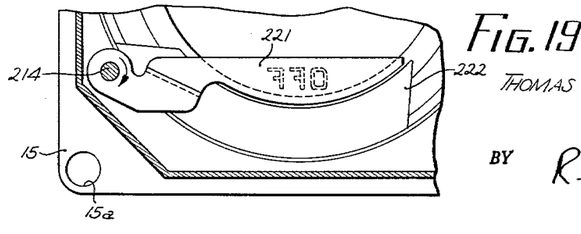
FIGURE 19 is a section along line 19—19 of FIGURE 18 showing the flag in the "off" position.

The end of the rod adjacent the ring 19 supports a flag 221 which carries the word "Off." When the shoe 211 is holding the outer gimbal, the flag is in its up position shown in FIGURES 1 and 19, to indicate that the instrument is de-energized. A shielding member 222 is located adjacent the ring 19 and when the rod 214 is rotated in the direction of the arrow of FIGURE 19, the flag 221 becomes invisible behand shield 222.

Figures 17, 18, 20:
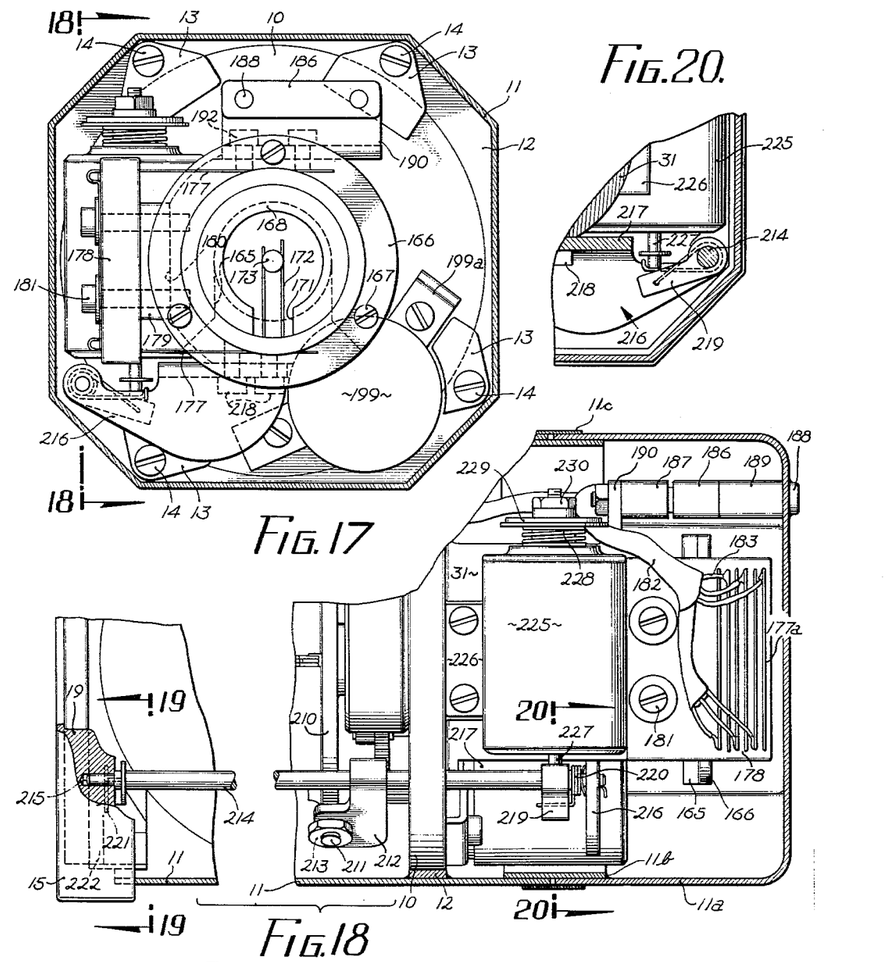
FIGURE 17 is a section along line 17—17 of FIGURE 2 illustrating the slip ring construction about the outer gimbal shaft.
FIGURE 18 is a sectional view along line 18—18 of FIGURE 17, showing the solenoid for actuating the gimbal brake and the indicator flag.
FIGURE 20 is a section along line 20—20 of FIGURE 18, illustrating the solenoid actuator for the flag.

A brake solenoid 225 is secured to the frame projection 31 by a bracket 226 and has an armature end 227 located opposite the end of arm 219 (see FIGURE 20). The other end of the armature is surrounded by a spring 228 located between the solenoid case and a plate 229 retained on the armature by nut 230. The winding of the brake solenoid (not shown) is connected with a pair of the leads in cable 193 and contains a time delay circuit of standard well known design. When the winding is de-energized, the spring 228 holds the armature retracted in the position shown in FIGURE 20, so that the spring 220 is effective to apply a force to the brake shoe 211 through rod 214. Upon energizing the gyroscope, power is simultaneously supplied to the winding of the solenoid 225 and to the gyro motor in order to bring the motor up to speed. However, because of the time delay in the brake solenoid winding, the armature does not immediately move to free the rim 210 from the brake shoe 211. After an interval of time which permits the gyro rotor to get up to speed, the solenoid armature will move against the spring 228 to rotate rod 214 through the lever 219. This rotation will free the outer gimbal and will move the flag 221 behind the shield 222.

The invention has now been described with relationship to one form of operative structure. It is understood that the gyroscope with its axially movable portions can be utilized in other instruments in which it is desired to maintain the gyro rotor in stable equilibrium when inoperative and in neutral equilibrium when operating and that another erecting system can be utilized for the gyroscope. The gyroscope can be of very light weight construction since no fast erection system is required and the gyroscope is therefore suitable for mounting on a cantilevered outer gimbal. Also, it is understood that the utilization of the redundant bearing support to reduce bearing and slip ring friction is not limited to a cantilevered gimbal shaft, but can be used in connection with other well known gimbal constructions. Various modifications are contemplated by those skilled in the art without departing from the spirit and scope of the invention as hereinafter defined by the appended claims.

What is claimed is:

1. In a gyroscope having an outer gimbal supported by a frame and an inner gimbal supported by said outer gimbal and carrying a gyro rotor:
    shaft means for pivotally supporting said outer gimbal;
    support means movable relative to said frame and carrying first slip ring means;
    first wiper means secured to said frame and engaging said first slip ring means;
    second slip ring means carried by said shaft means;
    second wiper means carried by said support means and connecting said first and second slip ring means; and
    means for oscillating said support means in opposite directions to apply opposite kinetic friction torques to said shaft means by said second wiper means.

2. In a gyroscope as defined in claim 1, wherein said support means comprises:
    a redundant bearing support located between said shaft means and said frame; and
    bearing means located between said shaft means and said redundant support and between said redundant support and said frame, said bearing means applying opposite kinetic friction torques to said shaft means during oscillation of said redundant support.

3. An attitude indicator for indicating movements of a mounting craft comprising an indicator frame, a gyroscope mounted by said frame and having a U shaped outer gimbal, an outer gimbal shaft projecting from the closed end of said outer gimbal, an indicating sphere mounted at the open end of said outer gimbal for rotation on an axis transverse to the axis of said outer gimbal shaft, an inner gimbal located between tthe legs of said outer gimbal and being mounted for rotation on an axis transverse to the axis of said outer gimbal shaft, a gyro rotor supported by said inner gimbal and means for erecting said rotor, means for connecting said inner gimbal to said indicating sphere to rotate said sphere upon relative movement between said frame and said rotor, means providing for cantilever support of said outer gimbal shaft in order to present an unobstructed view of the indicating sphere, said supporting means for said outer gimbal shaft comprising a redundant bearing support, bearing means located between said outer gimbal shaft and said redundant support and between said redundant support and said indicator frame, and means for oscillating said redundant support clockwise and counter-clockwise equal distances to alternately apply equal and opposite kinetic friction torques to said outer gimbal shaft which substantially cancel out, a first group of slip rings mounted on said redundant support and coacting with wipers carried by said indicator frame, and a second group of slip rings carried by said outer gimbal shaft and cooperating with wipers connected with said first group of slip rings, the continual oscillation of said redundant support causing kinetic friction slip ring torques on said outer gimbal which are equal and opposite and substantially cancel out.

4. In a gyroscope having an outer gimbal supported by a frame and an inner gimbal supported by said outer gimbal and carrying a gyro rotor, shaft means for pivotally supporting said outer gimbal, a redundant bearing support located between said shaft means and said frame, bearing means located between said shaft means and said redundant support and between said redundant support and said frame, means for oscillating said redundant support clockwise and counter-clockwise equal distances to apply equal and opposite kinetic friction torques to said shaft means which substantially cancel out, a first group of slip rings mounted on said redundant support and coacting with wipers carried by said frame, a second group of slip rings carried by said shaft means and cooperating with wipers connected with said first group of slip rings, and cable means extending through said shaft means and connecting said rotor with said second group of slip rings, the continual oscillation of said redundant support causing kinetic friction slip ring torques on said outer gimbal which are equal and opposite and substantially cancel out.

5. In a gyroscope having an outer gimbal supported by a frame and an inner gimbal supported by said outer gimbal and carrying a gyro rotor, shaft means for pivotally supporting said outer gimbal, a redundant bearing support located between said shaft means and said frame, bearing means located between said shaft means and said redundant support and between said redundant support and said frame, means for oscillating said redundant support clockwise and counter-clockwise equal distances to apply equal and opposite kinetic friction torques to said shaft means which substantially cancel out, said shaft means comprising a single shaft extending from one end of said outer gimbal, said bearing means comprising a first pair of bearings spaced apart and located between said shaft and said redundant support and a second pair of bearings spaced apart and located between said redundant support and said frame, said bearing means serving to provide a cantilevered support for said shaft, a first group of slip rings mounted on said redundant support and coacting with wipers carried by said frame, and a second group of slip rings carried by said cantilevered shaft and cooperating with wipers connected with said first group of slip rings.

References Cited by the Examiner

UNITED STATES PATENTS

| | | | |
|---|---|---|---|
| 841,612 | 1/07 | Kaempfe | 74—5 X |
| 1,452,485 | 4/23 | Tanner | 33—226 |
| 1,600,071 | 9/26 | Shaifer | 74—5 X |
| 1,989,826 | 2/35 | Schenk | 33—204.2 |
| 2,202,955 | 6/40 | Langgasser | 74—5.1 |
| 2,311,652 | 2/43 | Esval | 74—5.43 |
| 2,439,358 | 4/48 | Divoll | 3—204.2 X |
| 2,450,874 | 10/48 | Braddon | 33—204 |
| 2,492,992 | 1/50 | Handel | 33—204.2 |
| 2,891,407 | 6/59 | Glenny | 74—5.1 |
| 2,970,480 | 2/61 | Zeigler et al. | 74—5 |

FOREIGN PATENTS

| | | |
|---|---|---|
| 128,345 | 6/19 | Great Britain. |
| 134,234 | 11/19 | Great Britain. |
| 666,615 | 2/52 | Great Britain. |
| 1,142,614 | 4/57 | France. |

ISAAC LISANN, *Primary Examiner.*